(12) United States Patent
Morrison et al.

(10) Patent No.: US 8,918,541 B2
(45) Date of Patent: *Dec. 23, 2014

(54) SYNCHRONIZATION OF AUDIO AND VIDEO SIGNALS FROM REMOTE SOURCES OVER THE INTERNET

(76) Inventors: Randy Morrison, Henderson, NV (US); Lawrence Morrison, Austin, TX (US)

( * ) Notice: Subject to any disclaimer, the term of this patent is extended or adjusted under 35 U.S.C. 154(b) by 717 days.

This patent is subject to a terminal disclaimer.

(21) Appl. No.: 12/798,619

(22) Filed: Apr. 8, 2010

(65) Prior Publication Data

US 2010/0198992 A1 Aug. 5, 2010

Related U.S. Application Data

(63) Continuation-in-part of application No. 12/070,983, filed on Feb. 22, 2008, now Pat. No. 8,301,790.

(51) Int. Cl.
| | |
|---|---|
| G06F 15/16 | (2006.01) |
| H04J 3/06 | (2006.01) |
| H04W 24/00 | (2009.01) |
| G10H 1/00 | (2006.01) |
| G06F 17/30 | (2006.01) |
| G11B 27/10 | (2006.01) |

(52) U.S. Cl.
CPC ........ *G10H 1/0058* (2013.01); *G06F 17/30056* (2013.01); *G10H 2240/175* (2013.01); *G10H 2240/305* (2013.01); *G10H 2240/325* (2013.01); *G11B 27/10* (2013.01)
USPC .......................... 709/248; 370/503; 455/456.1

(58) Field of Classification Search
CPC .......... H04W 4/02; H04L 29/06; G06Q 10/10
USPC ........................................... 386/220; 709/248
See application file for complete search history.

(56) References Cited

U.S. PATENT DOCUMENTS

| | | | | |
|---|---|---|---|---|
| 5,446,759 | A * | 8/1995 | Campana, Jr. | ................. 375/267 |
| 6,067,566 | A | 5/2000 | Moline | |
| 6,462,264 | B1 | 10/2002 | Elam | |
| 6,710,815 | B1 | 3/2004 | Billmaier et al. | |
| 6,801,944 | B2 | 10/2004 | Motoyama et al. | |
| 6,891,822 | B1 | 5/2005 | Gubbi et al. | |
| 6,953,887 | B2 | 10/2005 | Nagashima et al. | |
| 7,050,462 | B2 | 5/2006 | Tsunoda et al. | |
| 7,072,362 | B2 | 7/2006 | Tsunoda et al. | |
| 7,394,974 | B2 * | 7/2008 | Kosugi et al. | .................. 386/248 |
| 8,086,698 | B2 * | 12/2011 | Rakowski et al. | ............ 709/218 |
| 2006/0002681 | A1 * | 1/2006 | Spilo et al. | ........................ 386/46 |
| 2006/0007943 | A1 | 1/2006 | Fellman | |
| 2006/0123976 | A1 | 6/2006 | Both et al. | |
| 2007/0030841 | A1 * | 2/2007 | Lee et al. | ....................... 370/352 |
| 2007/0081562 | A1 * | 4/2007 | Ma | ................................ 370/516 |
| 2007/0119640 | A1 * | 5/2007 | Ito et al. | ......................... 180/65.4 |
| 2007/0140510 | A1 * | 6/2007 | Redmann | ......................... 381/97 |
| 2007/0250851 | A1 * | 10/2007 | Lev | ................................. 725/25 |
| 2010/0198992 | A1 * | 8/2010 | Morrison et al. | .............. 709/248 |

* cited by examiner

*Primary Examiner* — Krista Zele
*Assistant Examiner* — Margishi Desai
(74) *Attorney, Agent, or Firm* — Thomas I. Rozsa

(57) ABSTRACT

The present invention is an architecture and technology for a method for synchronizing multiple streams of time-based digital audio and video content from separate and distinct remote sources, so that when the streams are joined, they are perceived to be in unison.

8 Claims, 8 Drawing Sheets

SYNCHRONIZATION OF AUDIO AND VIDEO SIGNALS FROM REMOTE SOURCES OVER THE INTERNET

This application is a continuation-in-part of patent application Ser. No. 12/070,983 filed on Feb. 22, 2008 now U.S. Pat. No. 8,301,790.

BACKGROUND OF THE INVENTION

1. Field of the Invention

The present invention relates to a method and system for synchronizing multiple signals received through different transmission mediums.

2. Description of the Prior Art

Synchronization systems are known in the prior art. The following eleven (11) patents and published patent applications are the closest prior art known to the inventor which are relevant to the present invention.

1. U.S. Pat. No. 6,067,566 issued to William A. Moline on May 23, 2000 for "Methods And Apparatus For Distributing Live Performances On Midi Devices Via A Non-Real-Time Network Protocol" (hereafter the "Moline Patent");

2. U.S. Pat. No. 6,462,264 issued to Carl Elam on Oct. 8, 2002 for "Method And Apparatus For Audio Broadcast Of Enhanced Musical Instrument Digital Interface (Midi) Data Formats For Control Of A Sound Generation To Create Music, Lyrics And Speech" (hereafter the "Elam Patent");

3. U.S. Pat. No. 6,710,815 issued to James A. Billmaier et al. on Mar. 23, 2004 for "Synchronizing Multiple Signals Received Through Different Transmission Mediums" (hereafter the "Billmaier Patent");

4. U.S. Pat. No. 6,801,944 issued to Satour Motoyama et al. on Oct. 5, 2004 for "User Dependent Control Of The Transmission Of Image And Sound Data In A Client-Server System" (hereafter the "Motoyama Patent");

5. U.S. Pat. No. 6,891,822 issued to Ralugopal R. Gubbi et al. on May 10, 2005 for "Method And Apparatus For Transferring Isocronous Data Within A Wireless Computer Network" (hereafter the "Gubbi Patent");

6. U.S. Pat. No. 6,953,887 issued to Yoichi Nagashima et al. on Oct. 11, 2005 for "Session Apparatus, Control, Method Therefor, And Program For Implementing The Control Method" (hereafter the "Nagashima Patent");

7. United States Published Patent Application No. 2006/0002681 issued to Michael Spilo et al. on Jan. 5, 2006 for "Method And System For Synchronization Of Digital Media Playback" (hereafter the "Spilo Published Patent Application");

8. United States Published Patent Application No. 2006/0007943 issued to Ronald D. Fellman on Jan. 12, 2006 for "Method And System For Providing Site Independent Real-Time Multimedia Transport Over Packet-Switched Networks" (hereafter the "Fellman Published Patent Application");

9. U.S. Pat. No. 7,050,462 issued to Shigeo Tsunoda et al. on May 23, 2006 for "Real Time Communication Of Musical Tone Information" (hereafter the "'462 Tsunoda Patent");

10. United States Published Patent Application No. 2006/123976 issued to Christopher Both et al. on Jun. 15, 2006 for "System And Method For Video Assisted Music Instrument Collaboration Over Distance" (hereafter the "Both Published Patent Application");

11. U.S. Pat. No. 7,072,362 issued to Shigeo Tsunoda et al. on Jul. 4, 2006 for "Real Time Communications Of Musical Tone Information" (hereafter the "'362 Tsunoda Patent").

12. United States Published Patent Application 2007/0140510 issued to William G. Redmann et. al. on Jun. 21, 2007 for "Method And Apparatus For Remote Real Time Collaborative Acoustic Performance And Recording Thereof" (hereafter the "Redmann Published Patent Application")

The Moline Patent is a method and apparatus for distributing live performances on MIDI devices via a non-real time network protocol. Techniques for distributing MIDI tracks across a network using non-real-time protocols such as TCP/IP. Included are techniques for producing MIDI tracks from MIDI streams as the MIDI streams are themselves produced and distributing the MIDI tracks across the network, techniques for dealing with the varying delays involved in the distributing the tracks using non-real-time protocols, and techniques for saving the controller state of MIDI track so that a user may begin playing the track at any point during its distribution across the network. Network services based on these techniques include distribution of continuous tracks of MIDI music for applications such as background music, distribution of live recitals via the network, and participatory music making on the network ranging from permitting the user to "play along" through network jam sessions to using the network as a distributed recording studio.

The detailed description of a preferred embodiment of the invention begins with an overview of the invention and then provides more detailed disclosure of the components of the preferred embodiment.

What is termed herein live MIDI is the distribution of a MIDI track from a server to one or more clients using a non-real-time protocol and the playing of the MIDI track by the clients as the track is being distributed. One use of live MIDI is to "broadcast" recitals given on MIDI devices as they occur. In this use, the MIDI stream produced during the recital is transformed into a MIDI track as it is being produced and the MIDI track is distributed to clients, again as it is produced, so that the clients are able to play the MIDI track as the MIDI stream is produced during the recital. The techniques used to implement live MIDI are related to techniques disclosed in the parent of the present patent application for reading a MIDI track 105 as it is received. These techniques, and related techniques for generating a MIDI track from a MIDI stream as the MIDI stream is received in a MIDI sequencer are employed to receive the MIDI stream, produce a MIDI track from it, distribute the track using the non-real-time protocol, and play the track as it is received to produce a MIDI stream. The varying delays characteristic of transmissions employing non real-time protocols are dealt with by waiting to begin playing the track in the client until enough of the track has been received that the time required to play the received track will be longer than the greatest delay anticipated in the transmission. Other aspects of the techniques permit a listener to being listening to the track at points other than the beginning of the track, and permit use of the non-real-time protocol for real-time collaboration among musicians playing MIDI devices.

The Elam Patent is a method and apparatus for audio broadcast of enhanced musical instrument digital interface (MIDI) data formats for control of a sound generator to create music, lyrics and speech. It specifically involves a method and apparatus for the transmission and reception of broadcasted instrumental music, vocal music, and speech using digital techniques. The data is structured in a manner similar to the current standards for MIDI data.

The Billmaier Patent which issued in 2004 is for synchronizing multiple signals received through different transmission mediums. Multiple signals received through different transmission mediums are synchronized within a set top box (STB) for subsequent mixing and presentation. Specifically, "FIG. 5 is a block diagram of various logical components of a system 500 for synchronizing a primary signal 402 with a secondary signal 404. The depicted logical components may be implemented using one or more of the physical components shown in FIG. 3. Additionally, or in the alternative, various logical components may be implemented as software modules stored in the memory 306 and/or storage device 310 and executed by the CPU 312.

In the depicted embodiment, a primary signal interception component 502 intercepts a primary signal 402 as it is received from the head-end 108. The primary signal interception component 502 may utilize, for example, the network interface 302 of FIG. 3 to receive the primary signal 402 from the head-end 108. The primary signal 402 may include encoded television signals, streaming audio, streaming video, flash animation, graphics, text, or other forms of content.

Concurrently, a secondary signal interception component 508 intercepts the secondary signal 404 as it is received from the head-end 108. As with the primary signal 402, the secondary signal 404 may include encoded television signals, streaming audio, steaming video, flash animation, graphics, text, or other forms of content. In one embodiment, the signal interception components 502, 508 are logical sub-components of a single physical component or software program.

Due to the factors noted above, reception of the secondary signal 404 may be delayed by several seconds with respect to the primary signal 402. Thus, if the secondary signal 404 were simply mixed with the unsynchronized primary signal 402, the results would be undesirable because the two are not synchronized.

Accordingly, a synchronization component 512 is provided to synchronize the primary signal 402 with the secondary signal 404. As illustrated, the synchronization component 512 may include or make use of a buffering component 514 to buffer the primary signal 402 for a period of time approximately equal to the relative transmission delay between the two signals 402, 404. As explained in greater detail below, the buffering period may be preselected, user-adjustable, and/or calculated."

Therefore, this invention discloses the concepts of synchronizing signals although they are not talking about more than two in this particular disclosure.

The Motoyama Patent is a user dependent control of the transmission of image and sound data in a client-server system. Specifically this patent discloses:

"Each user can select the rank in accordance with the performance of the client of the user, the degree of services to receive, an available amount of money paid to data reception, and the like. The rank is assigned to each user ID. The proxy server checks the rank form the user ID so that data matching the user rank can be supplied.

Each proxy server can detect its own load and line conditions. The main proxy server assigns each client a proxy server in accordance with the load and line conditions of each proxy server. A user can receive data from a proxy server having a light load and good line conditions so that a congested traffic of communications can be avoided and a communications delay can be reduced.

The main proxy server may detect a problem such as a failure to each proxy server in addition to the load and line conditions to change the connection of clients in accordance with the detected results. Even if some proxy server has a problem, this problem can be remedied by another proxy server.

When accessed by a client, the main proxy server 12 may assign the client any one of plurality of mirror servers 13. In this case, one of the mirror servers 13 transmits data to the client and the main proxy server 12 is not necessary to transmit data.

In the network shown in FIG. 1, the main server 7 is not always necessary. If the main server 7 is not used, the proxy server 12 or 13 becomes a server and which is not necessarily required to have a proxy function. In this case, the proxy servers 12 and 13 are not different from a general main server."

The Gubbi Patent is a method and apparatus for transferring isocronous data within a wireless computer network. It discloses:

"Also shown in FIG. 3 is an audio information buffer 74, which may also be a portion of memory 62 or one or more registers of processor 60. The audio information buffer 60 has several configurable thresholds, including an acute underflow threshold 76, a low threshold 78, a normal threshold 80, a high threshold 82 and an acute overflow threshold 84. The audio information buffer 74 is used in connection with the transfer of audio information from server 12 to the client unit 26 as follows.

In general, NIC 14 receives an audio stream from the host microprocessor 16 and, using the audio compression block 36, encodes and compresses that audio stream prior to transmission to the client unit 26. In one example, ADPCM coding may be used to provide a 4:1 compression ration. After transmission, client unit 26 may decompress and decode the audio information (e.g., using audio decompression unit 66) prior to playing out the audio stream to television 32. So, in order to ensure that these streams are synchronized, the audio information is time stamped at NIC 14 with respect to the corresponding video frame. This time stamp is meant to indicate the time at which the audio should be played out relative to the video. Then, at the client unit 26, the audio information is played out according to the time stamp so as to maintain synchronization (at least within a specified tolerance, say 3 frames).

Because, however, the host microprocessor 16 is unaware of this time stamping and synchronization scheme, a flow control mechanism must be established to ensure that sufficient audio information buffer 74, the client unit 26 can report back to the server 12 the status of available audio information. For example, ideally, the client unit 26 will want to maintain sufficient audio packets on hand to stay at or near the normal threshold 80 (which may represent the number of packets needed to ensure that proper synchronization can be achieved given the current channel conditions). As the number of audio packets deviates from this level, the client unit 26 can transmit rate control information to server 12 to cause the server to transmit more or fewer audio packets as required."

The Nagashima Patent which is assigned to Yamaha Corporation discloses a session apparatus, control method therefor, and program for implementing the control method. Specifically, the patent provides "there is provided a session apparatus that enables the user to freely start and enjoy a music session with another session apparatus without being restricted by a time the session should be started. A session apparatus is connected to at least one other session apparatus via a communication network in order to perform a music session with the other session apparatus. Reproduction data to be reproduced simultaneously with reproduction data received from the other session apparatuses is generated and transmitted to the other session apparatus. The reproduction data received from the other session apparatus is delayed by a period of time required for the received reproduction data to be reproduced in synchronism with the generated reproduction data, for simultaneous reproduction of the delayed reproduction data and the generated reproduction data."

The Spilo Published Patent Application is a method and system for synchronization of digital media. Specifically, synchronization is accomplished by a process which approximate the arrival time of a packet containing audio and/or video digital content across the network and instruct the playback devices as to when playback is to begin, and at what point in the streaming media content signal to begin playback. One method uses a timestamp packet on the network to synchronize all players.

The Spilo Published Patent Application references TCP/IP which can not be used for real-time communications. The Spilo Published patent application claims to use synchronized audio, even using multicast (UDP) is not possible. Transmission Control Protocol (TCP) and the Internet Protocol (IP) is by its very nature error-correcting so that if a packet in the stream is lot, TCP stops the stream and requests a rebroadcast of the missing packet.

Spilo only mentions using time-of-day for the main timing mechanism. NTP is not used as the Predictive Successive Approximations of the time-of-day. Due to the fluctuating nature of interne bandwidth, this would prove to cause a larger packet loss. Spilo only uses master time stamp and passes that time stamp to all clients. Spilo implies that all traffic goes to a centralized server. Spilo only mentions the use of MPEG encoder/decoders. No other information is available on this matter.

The Fellman Published Patent Application is for a method and system for providing site independent real-time multimedia transport over packet-switched networks. The patent discloses that site independence is achieved by measuring and accounting for the jitter and delay between a transmitter and receiver based on the particular path between the transmitter and receiver independent of site location. The transmitter inserts timestamps and sequence numbers into packets and then transmits from them. A receiver uses these timestamps to recover the transmitter's clock. The receiver stores the packets in a buffer that orders them by sequence number. The packets stay in the buffer for a fixed latency to compensate for possible network jitter and/or packet reordering. The combination of timestamp packet-processing, remote clock recovery and synchronization, fixed-latency receiver buffering, and error correction mechanisms help to preserve the quality of the received video, despite the significant network impairments generally encountered throughout the interne and wireless networks.

The '462 Tsunoda Patent discloses real time communications of musical tone information. Specifically, Column 2 of the patent beginning on Line 23 states:

"According to further aspect of the present invention, there is provided a communication system having a plurality of communications apparatuses each having receiving means and transmitting means, wherein: the receiving means of the plurality of communications apparatuses receive the same data; the transmitting means of the plurality of communications apparatuses can reduce the amount of data received by the receiving means and can transmit the reduced data; and the data reduced by one of the communications apparatuses is different form the data reduced by another of the communications apparatuses.

Since the data reduced by one and another of communications apparatuses is different, the quality of data transmitted from each communication apparatus is different. For example, the type or reduction factor of the reduced data may be made different at each communication apparatus. Therefore, a user can obtain data of a desired quality by accessing a proper communication apparatus.

According to still another aspect of the invention, there is provided a musical tone data communications method comprising the steps of: (a) transmitting MIDI data over a communications network; and (b) receiving the transmitted, the recovery data indicating a continuation of transmission of the MIDI data."

The Both Published Patent Application was published in June 2006. It discloses a system and method for video assisted music instrument collaboration over distance. Claim 1 reads as follows:

"A system for enabling a musician at one location to play a music instrument and have the played music recreated by a music instrument at another location, comprising:
at least first and second end points, the first end point being connectable to the second end point through a data network, each end point comprising:
a music instrument capable of transmitting music data representing music played on the instrument and capable of receiving music played on the instrument and capable of receiving music data representing music to be played on the instrument;
a video conferencing system capable of exchanging video and audio information with the video conferencing system of another end point through the data network; and
a music processing engine connected to the data network and the music instrument and having a user interface, the music processing engine being operable to receive music data from the instrument at the end point and to timestamp the receipt of the music data with a clock synchronized with end points in the system, to transmit the received music data with the timestamp to another end point in the system via the data network, to receive from the data network music data including timestamps from another end point and the buffer the received music data for a selected delay period and in the order indicated by the timestamps in the received music data and to forward the ordered music data, after the selected delay period to the music instrument connected to the end point to play the music represented by the music data."

The '362 Tsunoda Patent was issued in July 2006 and is assigned to Yamaha Corporation. For purposes of relevance, the same information quoted in the previous Tsunoda Patent is relevant to this Tsunoda Patent.

For the Redmann Published Patent Application, UDP/IP in 28 byte packets is used. This also implies that the sampling rate is 28 k, which is unusable in studio situations. In addition packets must be at multiple of the sample rate in order to not cause a network saturation effect. The Encoder/Decoder will lose synchronization at that rate Redmann uses "RTT" or Round Trip Time. This refers to IMCP pin which is good to get a general time, however each time an IMCP ping is sent it can use a completely different path to and from each client. Therefore at best ping you will get an average variance that will cause an unacceptable amount of lag/led.

In Redmann, the initiator playback device transmits to target playback device a message containing either a prediction of the target's internal time-of-day clock at receipt of the packet or the initiator's time-of-day. NTP from a single source is used. Redmann implies that all traffic goes to a centralized server. Redmann fades out of the last packet. UDP packets have a beginning but do not need an end. They state that they extend the end of one to overlap or "scale" with the next, the using the lost packet material as the basis for the "synthesized" replacement. This would render the application useless to studios. "Predictor-corrector algorithm" is used to create a synthesized representation for late packets and states it does not accurately reproduce late packets.

SUMMARY OF THE INVENTION

The present invention is an architecture and technology for a method for synchronizing multiple streams of time-based digital audio and video content from separate and distinct remote sources, so that when the streams are synchronized, they are perceived to be in unison.

An example of such sources would be several musicians, each in a different city, streaming music live onto the Internet. If two musicians are streaming their audio and video to a third musician or listener, the arrival time of their music will depend on their distance from the listener. This is because the streams are electronic in nature and so will travel at roughly the speed of light, which is constant for all observers. This means that the music of a nearby musician will arrive before the music of a more distant musician, even though they started performing at the same time. In order for the music to sound in unison, the streams of the nearby musician need to be buffered and delayed for the extra amount of time it takes the streams of the more distant musician to cover the extra distance. These differences in time are no more than thousandths of a second. The offset is not consciously heard by the participants (also referred to as clients).

Embodiments of the invention will utilize several standard time references, the Network Time Protocol (NTP) for communicating and synchronizing the time bases of each participating musician or listener. NTP is an Internet draft standard, formalized in RFC 958, 1305, and 2030.

The invention is to synchronize at least three signals so that they will arrive at the same time. Throughout the session, the server determines the network latencies of each client's stream by comparing the network time clocks of both the closest and the farthest away in the session. Based on the network time protocol server closest to each respective client, gain or lag is then calculated. The latency for each client will be roughly equal to the light travel time from clients to the server. For example, if the client is 1,000 miles from the server the latency will be roughly 1,000/c (the speed of light) which equal 5.4 milliseconds. These differences in time are no more than thousands of a second. The offset is not consciously heard by the participants (also referred to as clients).

Therefore, the concept is as follows. For the distances that are closer to the master client, the speed of transmission will be slowed down. For distances that are further from the master client, the transmission speed will be sped up. The concept is that the transmission speed is such that all the communications both visual and audio arrive at the clients at the same time. The control stream, containing all NTP timestamps and offsets are sent to each client so that each stream can be offset so that all streams appear to arrive at the same time. It is possible to communicate both through audio and through video synchronously through an online session so that they can produce things together such as videos, audio, sound tracks, etc. This can be achieved by adding latency to the streams which are closer until they match the latency of far away streams. The synchronized streams can then be mixed individually and fed back to each of the clients, who will then hear fellow musicians playing in unison. Accordingly, on example of a use of this would be to record a sound track where all the signals must be simultaneously and synchronously received and transmitted.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Figure 1:
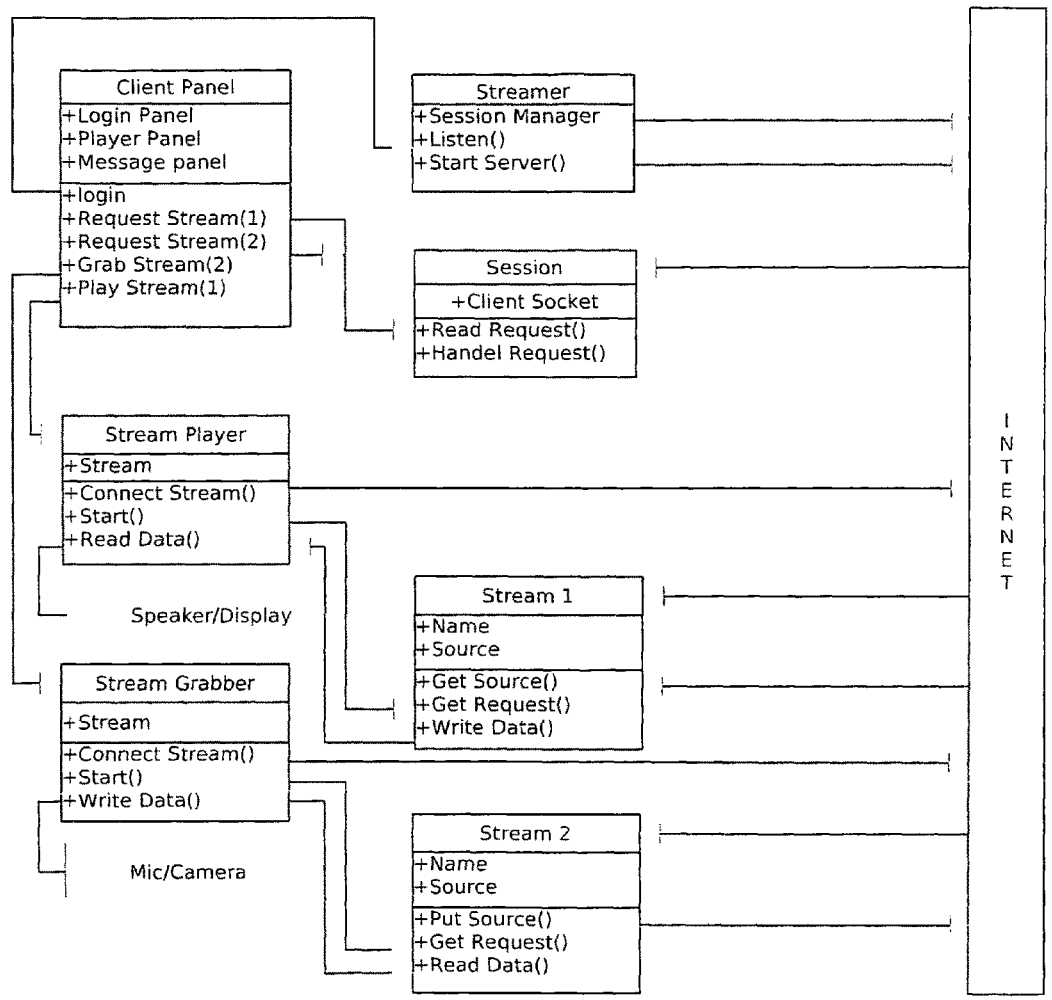
FIG. 1 is a block diagram of one example of software which is used to run the present invention client side.

Although specific embodiment's of the present invention will now be described with reference to the drawings, it should be understood that such embodiment's are by way of example only and merely illustrative of but a small number of the many possible specific embodiment's which can represent applications of the principles of the present invention. Various changes and modifications obvious to one skilled in the art to which the present invention pertains are deemed to be within the spirit, scope and contemplation of the present invention.

Embodiments of the invention will consist of the following components:

1. A session server to which clients may connect, add clients to their approved list, acquire a list of approved NTP servers and send messages to other participants;
2. A client application used to connect to other clients and to acquire adjusted NTP lists, offset NTP timestamps, verification of joining clients and to synchronously connect clients with each other;
3. A mechanism by which a client will acquire the NTP timestamps from all clients, traceroute to and from each client in the session and the session server, which will calculate the distance of each client and sync the offset timestamps of all clients; and
4. A mechanism by which the streams of clients will be offset until they are in sync with the streams of the furthest client.

The following scenario illustrates the mechanism of the invention: A musician in New York named Tony wants to play music with his friends Willy in Austin and Candi in Los Angeles over the Internet. Tony connects to the session server and requests to create a session. Similarly, Willy and Candi connect and request to join the same session. The server sends a time stamp to the Tony's client application and then to each participant in the session along with each client's authentication information and a list of NTP servers closest to the respective client applications. The client application will calculate the server's reference time based on the time stamp it receives, factoring in round-trip delay time between each client in the session. Each client will then traceroute to the NTP servers in the list it got from the session server and then pass all time stamps to the other clients in the session.

The client application that started the session, in this case Tony, is the leader of the session and he will start a reference time stamp. The reference time stamp will be synchronized to the time reference from Tony's client application (the Master Time stamp) so that it will set the pace for the master metronome to determine the delays or increases the pace at which the participants play.

Once the internal NTP clock is started, the client application of each participant will connect to all the other clients in the session and determine their latencies. All the NTP clocks are constantly adjusted to changing network conditions via NTP. Increasing or decreasing the metronome based on the time stamps from the other clients. This will bring the timing of all clients streams further in to sync. The participants will then play their music in sync with this metronome. The client applications will then synchronize their multimedia streams by delaying each stream according to its latency and the amount of increase or decrease in the metronome. This, in effect, will define a new metronome, the Delayed Metronome, which is slightly delayed or speed up in comparison with the Master Metronome. In Tony's case, Willy's streams will be delayed until Candi's streams have had a chance to cover the distance from LA to Austin. Candi's metronome will start a littler sooner than Willy's and Willy's metronome will start a little sooner than Tony's. At that point, Willy's and Candi's streams will be in unison in New York, and they will be in time with the Delayed. Metronome. In order to keep up, Tony must play in time with the Master Metronome, although he will hear the music in time with the Delayed Metronome. This brings the audio tracks into unison.

The above is set forth in the block diagram of the software of the present invention as set forth in FIG. 1-4.

FIG. 1 shows the following:

The Client application logs into the streamer. The session manager gets authentication from the database of users via ssh. The Streamer initializes the session.

The session is sent back to the client application requesting a stream from other clients. The client application starts a stream of audio and video. The Stream Grabber acquires both its own stream and other streams assigned by the session manager and sends them to the player. The Grabber also acquires both video and audio from the local machine.

Figure 2:
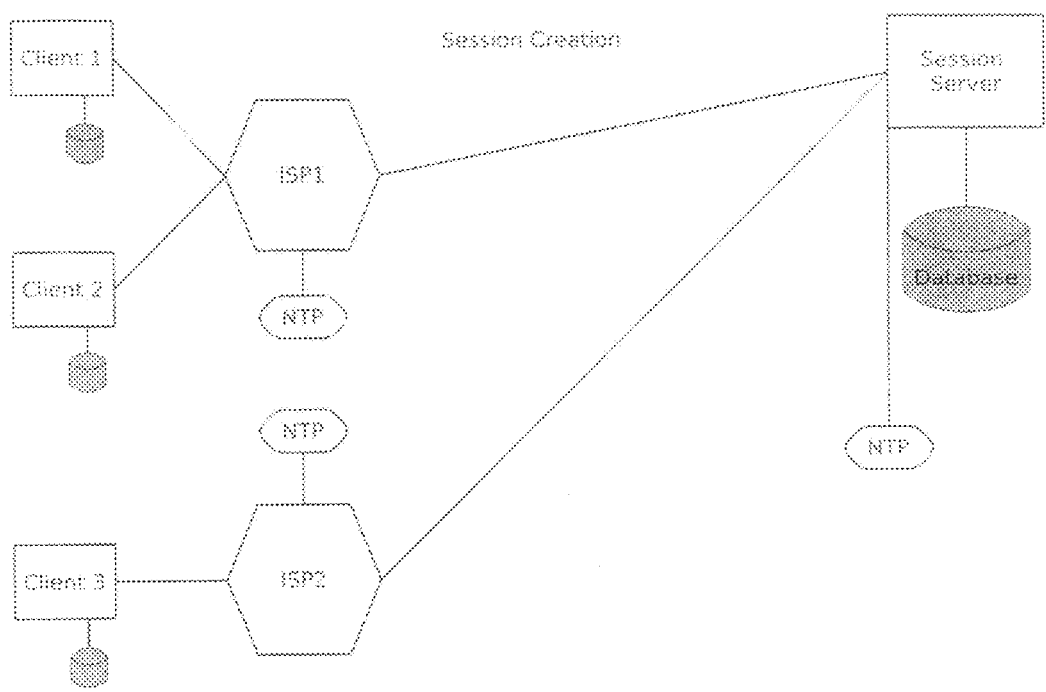
FIG. 2 is a block diagram of a session being created.

FIG. 2 shows the following:

The Stream Server listens for the Client Streamers. The Stream Manager adds the session to the list The Session manager starts the session in each client. The streams send session information back to the database.

Figure 3:
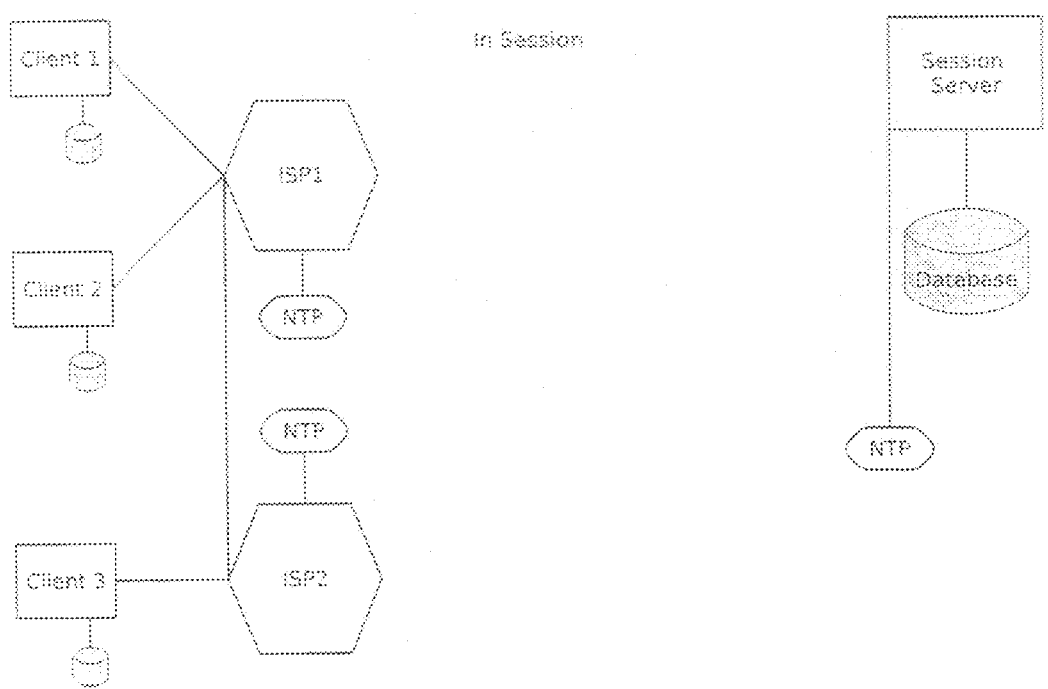
FIG. 3 is a block diagram of a session in progress.

FIG. 3 shows the following:

The client is connected to their interne service providers. Through the clients connection a local NTP server is contacted and used as a local NTP time reference. Also the clients connect to the session server to join or create a session. The session server, through its connection to the Internet uses a local NTP server as it's local time reference. The session server connects directly to the database for session information.

Figure 4:
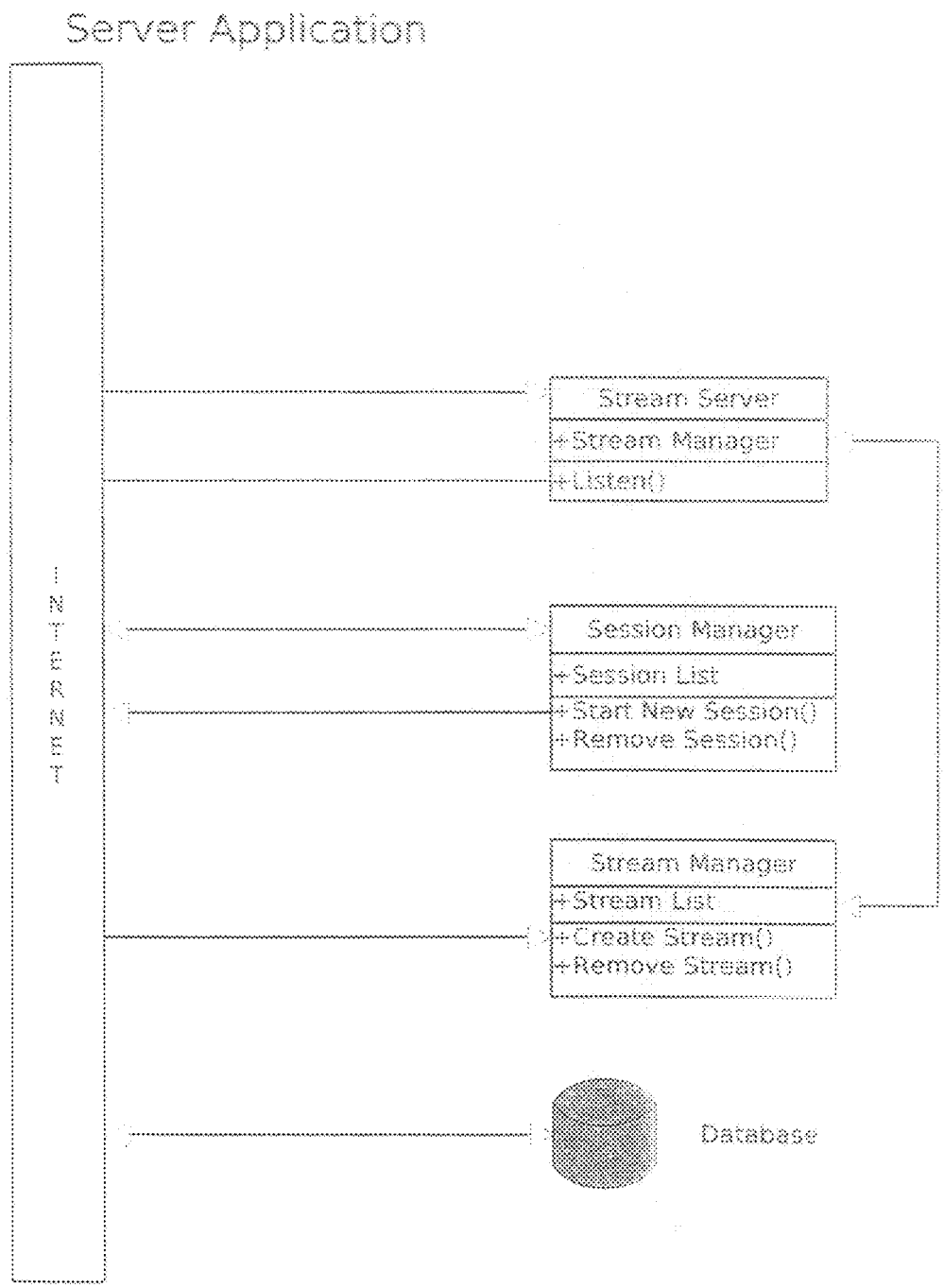
FIG. 4 is a block diagram of server authentication.

FIG. 4 shows the following;

Once the session is established the clients connect their streams with each other through their respective Internet providers. The clients also maintain a connection with their respective local NTP servers. The session server waits for any control data to be sent from any of the clients.

The key aspects of this embodiment of the invention are the mechanisms for synchronizing the time stamps of all participants and the mechanism by which the streams of participants will be delayed until they are in sync with the streams of the furthest client application. The first key aspect is achieved using the standard Network Time Protocol (NTP). NTP is an Internet draft standard, formalized in RFC 958, 1305, and 2030, that provides precise and accurate synchronization of NTP clocks in computers all around the world. Once clocks are synchronized with NTP, their precision is typically better than 50 milliseconds. The precision of the clocks can be increased by increasing the frequency of the polling of the NTP server. By adjusting the frequency, the invention achieves a precision better than 10 milliseconds.

The second key aspect of this embodiment of the invention is achieved using time stamps embedded within the transmitted streams. In the capture and streaming process, the audio and video data are digitized and then parceled out into packets. The packets are then transmitted in a stream over the Internet using the Real Time Protocol (RTP) over Peer to Peer (P2P). At intervals during the streaming process, the time stamp of the Master time stamp is encoded within the RTP stream packets.

When the receiver receives the packets, it decodes the time stamp from them and compares it with the time stamp of the Master time stamp. For each of the client application's streams, a record is kept of the difference in time of the time stamp from the Master time stamp. The stream with the highest difference, or latency, is designated as the Delay Reference Stream. The time stamp from the Delay Reference Stream is then used as the reference time for a second client applications timestamp, the Delayed time stamp.

Once the Delay Reference Stream has been determined, its data is immediately decoded and rendered to the participant. Other incoming streams are decoded, and then "paused" (buffered) until their time stamp agrees with the Delayed time stamp. Only then are they rendered to the participant. In this fashion, all the incoming streams are made to be in sync with the Delayed time stamp, and therefore, are in unison with one another.

The music heard by each participant will be synchronized to the Delayed time stamp, so the client applications beat in sync with the delay or increase added to further bring the client applications closer in time to each other. The latency due to digitization and packetization will be minimized. The network latency should be less than 500 milliseconds. In the dynamically changing environment of the Internet, NTP is used to adjust for changing latencies, like a person changing seats in the audience. Performers in large orchestras typically experience latencies of this magnitude in hearing instruments on the other side of the stage, due to the comparatively slow speed of sound. They have to play to their reference metronome, or time stamp which is the conductor. The invention, then, will allow online musicians to have an experience similar to what they would have if they were playing together in a large auditorium.

In an alternative embodiment of the present invention, the present invention is a means for providing synchronous delivery and playback of three or more electronic audio or video files from multiple clients, having differing arrival latencies, from clients from multiple locations communicating through the internet, during an on-line session, the synchronous delivery and playback means comprising:

a. a session server having a list of Network Time Protocol (NTP) servers, the list is passed to each client through the internet so that each client can acquire its own time reference;

b. a client application, said client application connecting each client to each other and to the session server, each client utilizing a formalized Internet time standard, said Internet time standard being the NTP, each client having an NTP clock which is shared with all clients;

c. a timing mechanism, said timing mechanism adjusting each client's NTP timestamp in the client application of all clients; and d. a file calibrating mechanism in each client application, said file calibrating mechanism having a buffer, a mixer, and an offset NTP timestamp, said buffer having a means for analyzing the difference in arrival latencies of streams by all clients, and a means for synchronizing the streams, by which the arrival latency of any client's stream may be increased so that all streams by all clients arrive at the same time, and said mixer returns each stream to all respective clients, and said adjusted timestamp from all clients being the timing means of each stream The synchronous delivery and playback means further comprises an offset NTP timestamp, said NTP timestamps are controlled by each of the clients, and each client is constantly monitoring the NTP server that each respective client chose so as to continuously adjust the timing conditions.

The present invention is also an apparatus to provide synchronous delivery and playback of three or more electronic audio or video files from multiple clients, having differing arrival latencies, from clients from multiple locations communicating through the Internet, during an on-line session, the synchronous delivery and playback apparatus comprising:

a. a session server having a list of Network Time Protocol (NTP) servers, the list is passed to each client through the internet so that each client can acquire its own time reference;

b. a client application, said client application connecting each client to each other and to the session server, each client utilizing a formalized Internet time standard, said Internet time standard being the NTP, each client having an NTP clock which is shared with all clients;

c. a timing mechanism, said timing mechanism adjusting each client's NTP timestamp in the client application of all clients; and d. a file calibrating mechanism in each client application, said file calibrating mechanism having a buffer, a mixer, and an offset NTP timestamp, said buffer having a means for analyzing the difference in arrival latencies of streams by all clients, and a means for synchronizing the streams, by which the arrival latency of any client's stream may be increased so that all streams by all clients arrive at the same time, and said mixer returns each stream to all clients, and said adjusted timestamp from all clients being the timing means of each stream.

The file calibrating mechanism synchronizes streams based on the offset NTP timestamps of each client so that the streams arrive at each client in sync with the other clients.

The file calibrating mechanism aligns the streams with the other clients' streams and then returns the stream simultaneously to all clients.

The client application utilizes a formalized Internet time standard, said Internet time standard being the NTP.

The synchronous delivery and playback means further comprises an NTP timestamp, said timestamp is controlled by each of the clients, and constantly monitoring the NTP server that client choose so as to continuously adjust the timing conditions.

The file calibrating mechanism further comprises an offset timestamp, said timestamp being the timing of that client after the stream has been synchronized with the other streams.

Described in detail, the present invention is a method to provide synchronous delivery and playback of three or more electronic audio or video files from multiple clients, having differing arrival latencies, from clients from multiple locations, during an on-line session, the synchronous delivery and playback method comprising:

a. creating a session on each client;

b. allowing clients to request to join the session;

c. approving or denying the client's request to join the session;

d. acquiring a Network Time Protocol (NTP) server and timestamp;

e. only after approval, joining the client to the session and time stamping the participant's session;

f. enabling a client application, the client application calculating the NTP server's timestamp and factoring in a delay time;

g. starting an NTP clock, the clock synchronized to the timestamp of its chosen NTP server and is given to all clients;

h. connection by the client application to the client application of the other participants and determination of each client's time differentials;

i. adjusting constantly the NTP timestamps to the changes in the network conditions;

j. buffering and synchronizing the clients' multimedia streams so that all streams are transmitted so as to arrive at the same time as the slowest stream;

k. creating a time stamped stream, said time stamped stream is buffered and synchronized multimedia streams;

l. utilizing the embedded time stamp within the transmitted streams to determine which stream has the greatest latency as compared to its own NTP timestamp;

m. decoding all streams as they arrive at each client;

n. designating the stream with the greatest latency as the delay reference stream;

o. buffering all other streams until each stream's time stamp matches that of the delay reference stream; and p. rendering the all outgoing streams to all clients such that the client with the least latency receives its stream at the same time as the participant with the greatest latency.

The synchronous delivery and playback method in accordance with claim 9, wherein said synchronous delivery and playback method further aligns the synchronized stream so that each client receives the stream in sync.

The synchronous delivery and playback method further comprises aligning the streams so that all streams appear simultaneously to the clients.

The synchronous delivery and playback method utilizes a formalized Internet time standard, said time standard being the NTP.

The synchronous delivery and playback method further comprises an NTP timestamp, said timestamp controlled by each of the participants, and constantly monitoring the NTP timestamp so as to continuously adjust the timing conditions.

Figure 5:
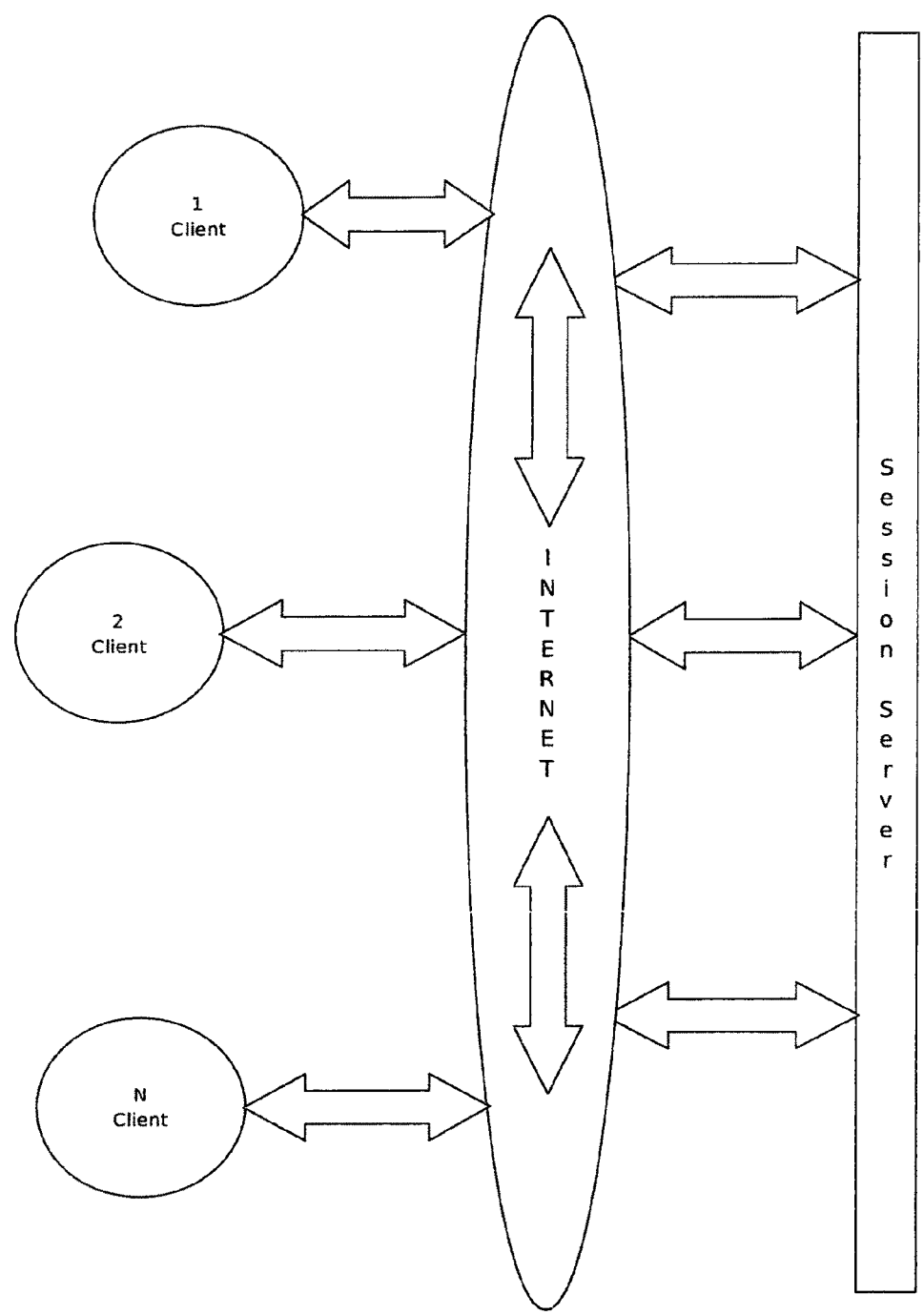
FIG. 5 is a block diagram illustrating that each client communicates with the session server through the interne.

Referring to FIG. 5, there is illustrated a simplified block diagram illustrating that each of the clients, 1 through "n" is connected to the session server through the internet. The communication is a two way communication from the client to the server and the server to the client. The participants in the session are referred to as clients.

Figure 6:
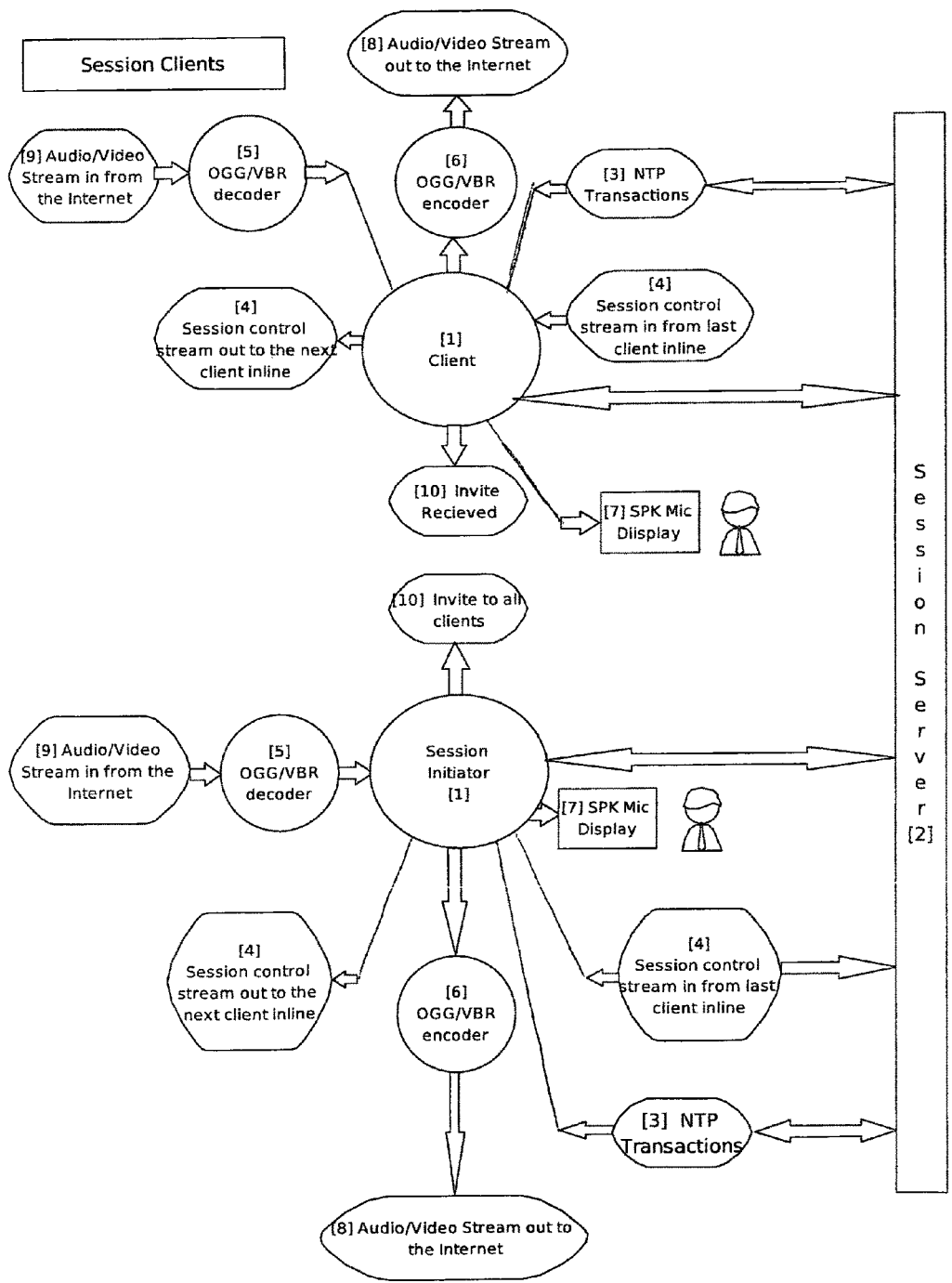
FIG. 6 is a block diagram illustrating the operation of the preferred embodiment of the present invention.
Figure 7:
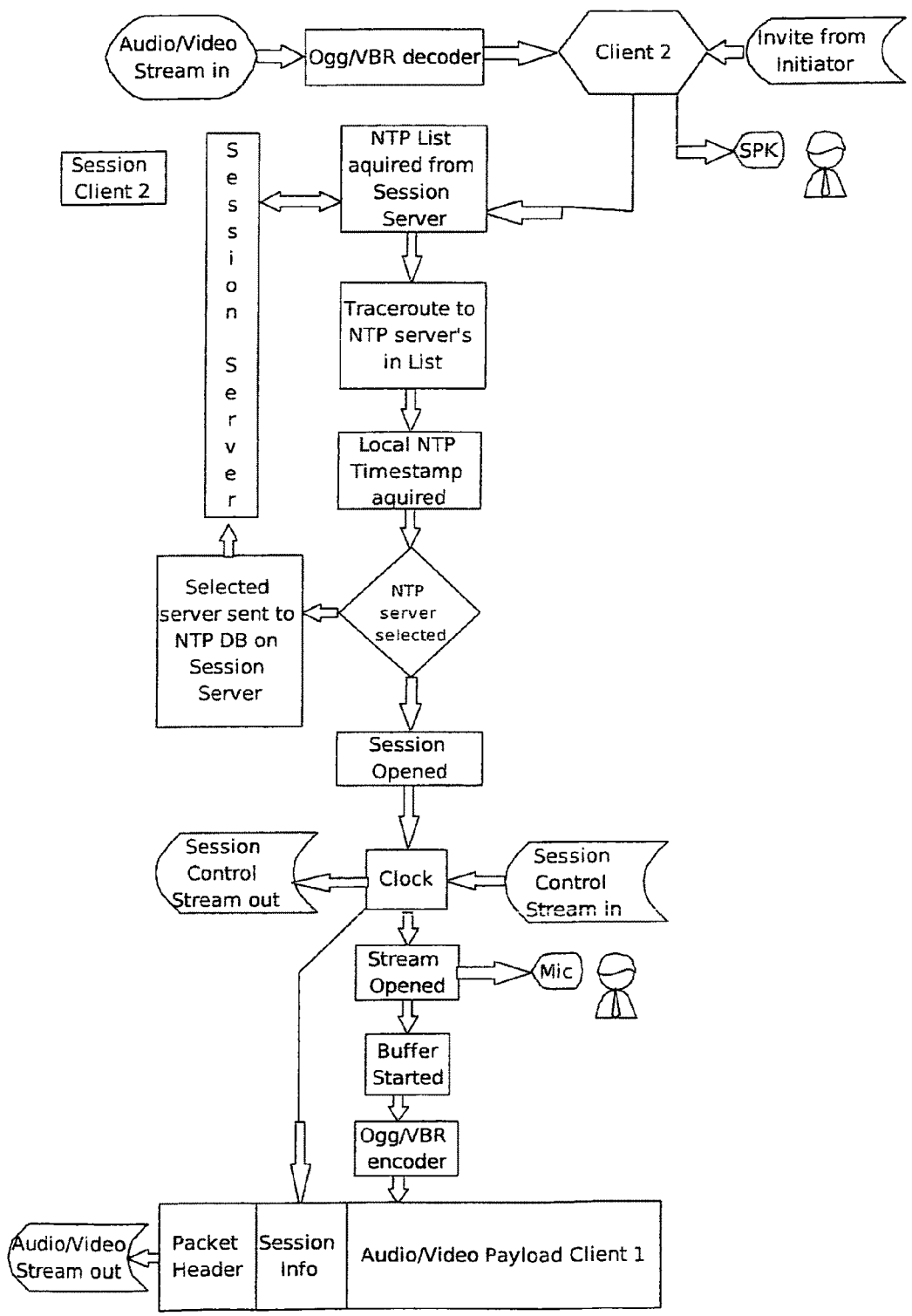
FIG. 7 is also a block diagram illustrating the preferred embodiment of the present invention, illustrated in a different way from FIG. 6.
Figure 8:
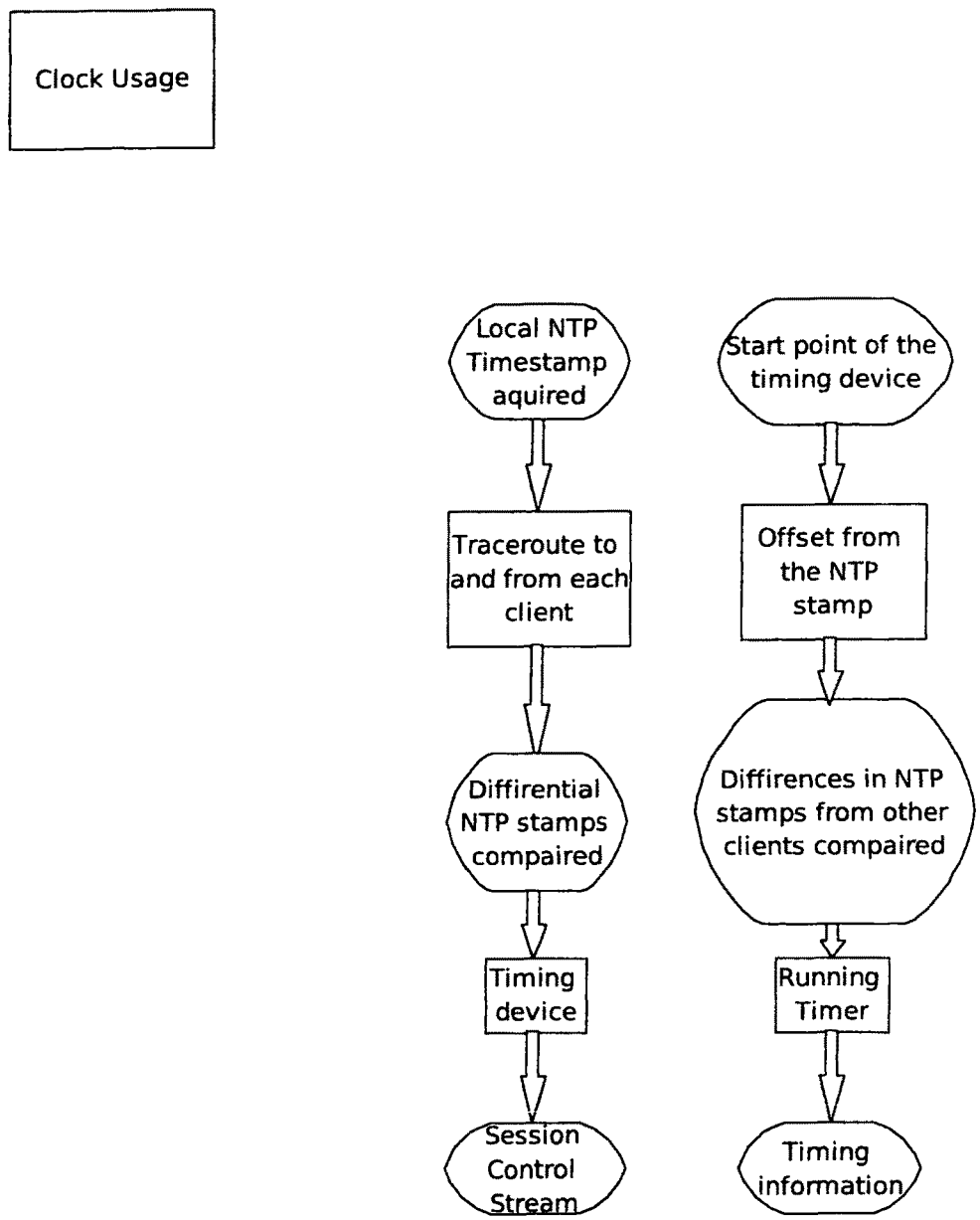
FIG. 8 is a block diagram illustrating the clock usage of the preferred embodiment of the present invention.

Referring to FIGS. 6 through 8, there is illustrated a detailed flow chart of the preferred embodiment of the present invention. All communication is sent through the Internet. The Session Initiator 1 starts the software program to start a session. The session initiator 1 is also a client. The software interface appears on the computer screen of each participant. The session name and participants (clients) are selected. A list of clients the Session Initiator would like to use is selected. The client list is then sent to the Session Server 2 to be checked. A list of people the Session Initiator would like to use as clients is sent to the Session Server for validation against a database of clients. The Session Server sends back to the Session Initiator 1 a list of validated clients. Validation mean That the client has an approved NTP software for use in the session with the Session Server 1.

The Session Initiator 1 then sets up the session. The software checks its network connection an starts initializing each of the parts of the software.

The software then begin transactions 3 involving the Network Time Protocol ("NTP"). An NTP list is requested from the Session Server. The NTP list is acquired from the Session Server. An Internet Message Content Protocol ("IMCP") Traceroute is sent to NTP servers in the list. The NTP timestamps are received from the NTP sources closest top each client. The closest NTP server is selected by each respective client and a timestamp is written to the clock file for each client's NTP Server.

The information about each NTP Server selected is sent back to the Session Server 2. This is to set the selected NTP server first in the list to provide each client in the next session it is a part of for as long as the client has a valid login.

The Session Control Stream 4 is then established. A Transmission Control Protocol and Internet Protocol (TCP/IP) is established between all of the clients 1, the Session Server 2, and the Session Initiator 1 who is also a client, containing the NTP servers the Session Initiator 1 and each client 1 selected, the Session name and the clients in the session.

An invitation 10 is sent over the Control Stream 4 to each client contain each client. The invitation contains the client's IP address, name and NTP timestamp. The accepted invites are received from each client joining the session over the control stream 4.

A clock is start by the Session Initiator 1 based on CPU clock cycles. This replaces the use of "time-of-day".

A User Datagram Protocol (UDP/IP) is established between each client 1 and the Session Initiator 1. This is the pipe that all payload data is sent to and from each client. No UDP/IP stream is established between the clients and the Session Server 2.

An OGG/VBR Decoder 5 is started and connected to the outgoing (UDP based) UDT/IP streams. It takes digitized data and turns it into analog data for the screen and speakers to play.

The OGG/VBR Encoder 6 is started and connected to the incoming IP streams. It takes analog data from the stream and turns it into digitized data ready for the UDT/IP stream.

The Speaker Microphone Display 7 is attached to the outgoing OGG/VBR Encoder. This creates analog audio data.

The Speaker 7 is attached to the incoming OGG/VBR Decoder. This plays analog audio data. The Display 7 is where digital video data is outputted to the screen.

The Audio/Video Stream 9 is the digitized Audio/Video data received from the Internet and sent to the OGG/VBR Decoder.

In summary, 1 is the Software Client, 2 is the Control Server, 3 is the Network Time Protocol Actions, 4 is the Control Information, 5 is Audio and Video to analog, 6 is Audio and Video to digital, 7 is Speaker, Microphone and display hardware, 8 is UDT/IP stream to clients, 9 is UDT/IP stream from clients, and 10 is Signal sent to inform each client to join a session.

The Control Information 4 is also referred to as a client application. VBR stands for variable bit rate.

ConnectionOpen.com is used in the application of the present invention which optimizes speed of transmission. UDP encapsulation UDT is used. UDT is an optimization technique that uses the smallest amount of bandwidth and processing time. If a packet is lost during transmission, it is strictly dropped. One packet lost is usually not detectable to the human ear.

NTP time stamps from the closest NTP source to each respective client is compared to network conditions.

NTP timestamps from the closest NTP source to each respective client is compared to network conditions. The present invention system never quits checking all time stamps throughout the transmission. The present invention uses a "round robin" pattern to relay timestamps, not system time. Time-of-day is not used due to its inherent drift. Instead, a "clock" application is started and NTP timestamps are exclusively used. All audio/video traffic is routed in between each involved client. No audio/video data is passed to the Session Server. This frees the Session Server to hold thousands of time the sessions of any other method of delivery. In the present invention Connection/Open does not process the audio or video. Audio is delivered to everyone lag- and loss-free.

UDP is sometimes called the Universal Datagram Protocol. UDT introduced a new congestion control protocol that allowed the protocol to run "fairly and friendly" with concurrent UDP and TCP flows. This will allow the present invention to determine the amount of bandwidth used by each client. NTP The Network Time Protocol is a protocol for synchronizing the clocks of computer systems over packet-switched, variable-latency data networks.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A method for providing synchronous delivery and playback of three or more electronic audio or video files from multiple clients, having differing arrival latencies, from clients from multiple locations communicating through the Internet, during an on-line session, the synchronous delivery and playback method comprising:

a. creating a session server having a list of Network Time Protocol (NTP) servers, passing the list to each client through the Internet so that each client will acquire that client's own time reference;

b. enabling a client application to provide authorization so that the client application enables each client to connect each client to each other client and to the session server, each client utilizing a formalized Internet time standard, said Internet time standard being the NTP, each client having an NTP clock which is shared with all clients;

c. starting the NTP clock, the NTP clock synchronized to the time stamp of its chosen NTP server and given to all clients, providing a timing adjustor for adjusting each client's NTP timestamp in the client application of all clients, enabling the NTP timestamp adjustor of each client to acquire the NTP timestamp from all clients, in the session and the session server, enabling the session server to calculate the distance of each client and synch any NTP timestamp of all clients, so that streams of the clients will be offset until each stream of a client is in synch with the stream of the furthest client;

d. constantly adjusting the NTP timestamp to change in the network conditions, and providing a file calibrator in each client application, said file calibrator having a buffer, a mixer, and the NTP timestamp, said buffer having a method for analyzing the difference in arrival latencies of streams by all clients, and a method for synchronizing the streams, by which the arrival latency of any client's stream may be increased so that all streams by all clients arrive at the same time, and said mixer returns each stream to all clients, and said adjusted NTP timestamp from all clients being the timing method of each stream;

e. providing respective receivers at each client and at the session server receiving packets of information from each client, each receiver decoding the NTP timestamp from each client and comparing it with an NTP timestamp of the formalized Internet time standard, keeping a record for each client of the difference in time of the time stream from the formalized Internet time standard, the stream with the highest difference designated as the delay reference stream and the NTP timestamp from the delay reference stream is used as a reference time delayed NTP timestamp; and f. once the delayed reference stream has been determined, its data is immediately decoded and rendered to the client having the delayed reference stream, other incoming streams are then decoded and then paused until their NTP timestamp agrees with the delayed NTP timestamp and only then are they rendered to the client having that respective stream so that all incoming streams are in sync with the delayed NTP timestamp and are therefore in unison with one another.

2. A method to provide synchronous delivery and playback of three or more electronic audio or video files from multiple clients, having differing arrival latencies, from clients from multiple locations communicating through the Internet, during an on-line session, the synchronous delivery and playback method comprising:

a. creating a session server having a list of Network Time Protocol (NTP) servers, the list is passed to each client through the Internet so that each client will acquire that client's own time reference;

b. enabling a client application to provide authorization so that the client application enables each client to connect each client to each other client and to the session server, each client utilizing a formalized Internet time standard, said Internet time standard being the NTP, each client having an NTP clock which is shared with all clients;

c. providing to each client a timing adjustor for adjusting each client's NTP timestamp in the client application of all clients, the timing adjustor for adjusting each client's NTP timestamp in the client application of all clients, the timing adjustor enables each client to acquire the NTP timestamp from all clients, in the session and the session server, which will calculate the distance of each client and synch any NTP stamps of all clients, so that the streams of the clients will be offset until each stream of a client is in synch with the streams of the furthest client;

d. constantly adjusting the NTP timestamp to change the network conditions, a file calibrator in each client application, said file calibrator having a buffer, a mixer, and an NTP timestamp, said buffer having a method for analyzing the difference in arrival latencies of streams by all clients, and a method for synchronizing the streams, by which the arrival latency of any client's stream may be increased so that all streams by all clients arrive at the same time, and said mixer returns each stream to all clients, and said adjusted NTP timestamp from all clients being the timing method of each stream, the file calibrator performs additional functions selected from the group consisting of the file calibrator synchronizes streams based on an NTP timestamp of each client so that the streams arrive at each client in synch with the other clients and the file calibrator aligns the streams with the other clients' streams and then returns the streams simultaneously to all clients;

e. at the session server receiving packets of information from each client, the receiver decoding the NTP timestamp from each client and comparing it with the NTP timestamp of the formalized Internet time standard, keeping a record for each client of the difference in time of the time stream from the formalized Internet time standard, the stream with the highest difference designated as the delay reference stream and the NTP timestamp from the delay reference stream is used as a reference time delayed NTP timestamp; and f. once the delayed reference stream has been determined, its data is immediately decoded and rendered to the client having the delayed reference stream, other incoming streams are then decoded and then paused until their NTP timestamp agrees with the delayed NTP timestamp and only then are they rendered to the client having that respective stream so that all incoming streams are in sync with the delayed NTP timestamp and are therefore in unison with one another.

3. A method to provide synchronous delivery and playback of three or more electronic audio or video files from multiple clients in accordance with claim 2, further providing an NTP timestamp, said NTP timestamp is controlled by each of the clients, and constantly monitoring the NTP timestamp so as to continuously adjust the timing conditions.

4. A method to provide synchronous delivery and playback of three or more electronic audio or video files from multiple clients in accordance with claim 2, further comprising said file calibrator further comprises an NTP timestamp, said NTP timestamp being the timing of that client after the stream has been synchronized with the other streams.

5. A method to provide synchronous delivery and playback of three or more electronic audio or video files from multiple clients, having differing arrival latencies, from clients from multiple locations, during an on-line session, the synchronous delivery and playback method comprising:

a. creating a session on each client;

b. allowing clients to request to join the session;

c. approving or denying the client's request to join the session;

d. acquiring a Network Time Protocol (NTP) server and timestamp and utilizing a formalized Internet time standard being the Network Time Protocol (NTP);

e. only after approval, joining the client to the session and time stamping the participant's session;

f. enabling a client application, the client application calculating the NTP server's NTP timestamp and factoring in a delay time, said client application connecting each client to each other client and to the session server, each client utilizing a formalized Internet time standard, said Internet time standard being the NTP, each client having an NTP clock which is shared with all clients;

g. starting an NTP clock, the clock synchronized to the timestamp of its chosen NTP server and is given to all clients, a timing adjustor for adjusting each client's NTP timestamp in the client application of all clients, the timing adjustor enables each client to acquire the NTP stamp from all clients, in the session and the session server, which will calculate the distance of each client and synch any NTP timestamp of all clients, so that the streams of the clients will be offset until each stream of a client is in synch with the streams of the furthest client;

h. connection by the client application to the client application of the other participants and determination of each client's time differentials;

i. constantly adjusting the NTP timestamp to changes in the network conditions, a file calibrator in each client application, said file calibrator having a buffer, a mixer, and an NTP timestamp, said buffer for analyzing the difference in arrival latencies of streams by all clients, and for synchronizing the streams, by which the arrival latency of any client's stream may be increased so that all streams by all clients arrive at the same time, and said mixer returns each stream to all clients, and said adjusted NTP timestamp from all clients being the timing method of each stream;

j. buffering and synchronizing the clients' multimedia streams so that all streams are transmitted so as to arrive at the same time as the slowest stream;

k. creating a time stamped stream, said time stamped stream is buffered and synchronized multimedia streams;

l. utilizing the embedded time stamp within the transmitted streams to determine which stream has the greatest latency as compared to its own NTP timestamp;

m. decoding all streams as they arrive at each client;

n. designating the stream with the greatest latency as the delay reference stream;

o. buffering all other streams until each stream's time stamp matches that of the delay reference stream;

p. rendering the all outgoing streams to all clients such that the client with the least latency receives its stream at the same time as the participant with the greatest latency;

q. at the session server receiving packets of information from each client, the receiver decoding the NTP timestamp from each client and comparing it with the NTP timestamp of the formalized Internet time standard, keeping a record for each client of the difference in time of the time stream from the formalized Internet time standard, the stream with the highest difference designated as the delay reference stream and the NTP timestamp from the delay reference stream is used as a reference time delayed NTP timestamp, and r. once the delayed reference stream has been determined, its data is immediately decoded and rendered to the client having the delayed reference stream, other incoming streams are then decoded and then paused until their NTP timestamp agrees with the delayed NTP timestamp and only then are they rendered to the client having that respective stream so that all incoming streams are in sync with the delayed NTP timestamp and are therefore in unison with one another.

6. A method to provide synchronous delivery and playback of three or more electronic audio or video files from multiple clients in accordance with claim 5, further comprising said synchronous delivery and playback method further aligns the synchronized stream so that each client receives the stream in sync.

7. A method to provide synchronous delivery and playback of three or more electronic audio or video files from multiple clients in accordance with claim 5, further comprising said synchronous delivery and playback method further comprises aligning the streams so that all streams appear simultaneously to the clients.

8. A method to provide synchronous delivery and playback of three or more electronic audio or video files from multiple clients in accordance with claim 5, further comprising said synchronous delivery and playback method further comprises an NTP timestamp, said NTP timestamp controlled by each of the participants, and constantly monitoring the NTP timestamp so as to continuously adjust the timing conditions.

* * * * *